(12) United States Patent
Surette

(10) Patent No.: US 6,209,260 B1
(45) Date of Patent: Apr. 3, 2001

(54) CEMETERY PLANTER

(75) Inventor: Robert J. Surette, Shrewsbury, MA (US)

(73) Assignee: Jeffrey J. Surette, Beverly Farms, MA (US)

( * ) Notice: Subject to any disclaimer, the term of this patent is extended or adjusted under 35 U.S.C. 154(b) by 0 days.

(21) Appl. No.: 09/313,320

(22) Filed: May 17, 1999

(51) Int. Cl.$^7$ ........................................................ A01G 9/02
(52) U.S. Cl. ................................ 47/65.5; 47/66.1; 52/12
(58) Field of Search .......................... 47/68, 65.5, 66.1, 47/85, 86, 39, 41.01; 119/74; 52/11, 12

(56) References Cited

U.S. PATENT DOCUMENTS

| | | | |
|---|---|---|---|
| 2,477,509 | * | 7/1949 | Burgesser . |
| 4,553,356 | * | 11/1985 | Peper ........................................ 52/11 |
| 4,553,357 | * | 11/1985 | Pepper ...................................... 52/12 |
| 4,640,045 | * | 2/1987 | Nesbitt et al. ........................ 47/39 X |
| 4,776,544 | * | 10/1988 | Williams ................................ 52/11 X |
| 5,320,319 | * | 6/1994 | Winger et al. ......................... 47/39 X |
| 5,519,966 | * | 5/1996 | Cassette ............................... 47/41.01 |
| 5,687,510 | * | 11/1997 | Basista ...................................... 52/11 |
| 5,943,820 | * | 8/1999 | O'Connell ....................... 47/41.01 X |
| 5,953,859 | * | 9/1999 | Cochran et al. ...................... 47/66.5 |
| 6,125,593 | * | 10/2000 | Randolph ............................. 42/11 X |
| 6,134,843 | * | 10/2000 | Tregear ..................................... 52/12 |

\* cited by examiner

*Primary Examiner*—Peter M. Poon
*Assistant Examiner*—Kevin Jakel
(74) *Attorney, Agent, or Firm*—John E. Toupal; Harold G. Jarcho

(57) ABSTRACT

A cemetery planter including a box having a first box portion with a bottom wall, a front wall, a back wall, an end wall and an open end, and a second box portion with a bottom wall, a front wall, a back wall, an end wall and an open end; the open end of the first box portion being received by the open end of the second box portion during sliding engagement therebetween. Also included are a plurality of longitudinally spaced apart U-shaped brackets substantially parallel to the end walls and substantially conforming to the front, back and bottom walls of the box portions; each U-shaped bracket having one end defining an inwardly directed first hook portion for engaging an upper front edge of the box and an opposite end defining an inwardly directed second hook portion for engaging an upper rear edge of the box and the first and second hook portions being shaped to receive pairs of overlapped front and back wall portions of the slidably engaged first and second box portions. A mounting mechanism facilitates attachment of the box to a support surface. The sliding engagement allows length adjustment of the box while the first and second hook portions provide stability and guidance.

19 Claims, 3 Drawing Sheets

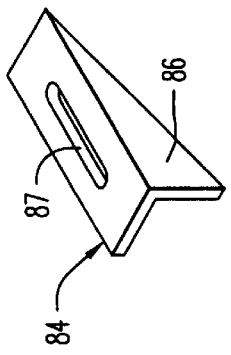
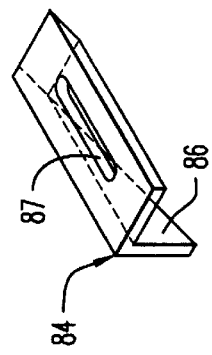
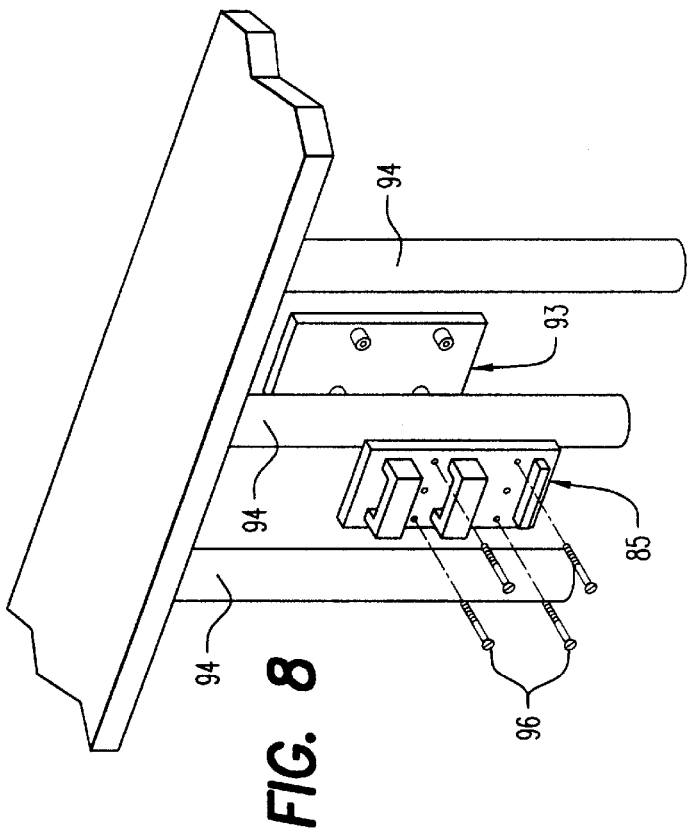
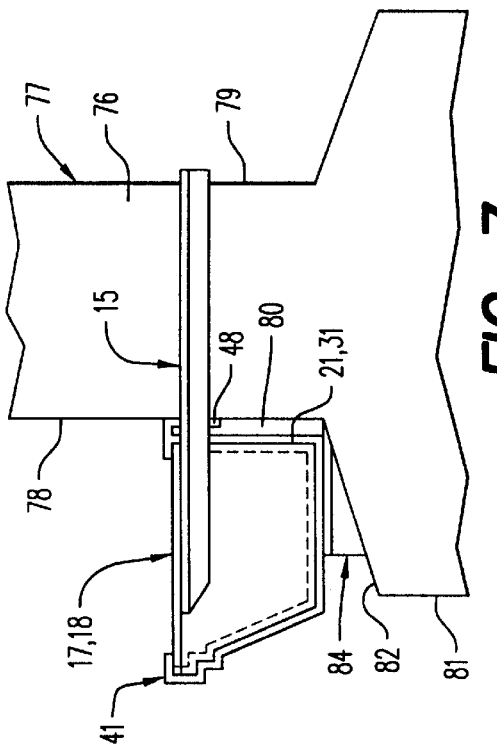

CEMETERY PLANTER

BACKGROUND OF THE INVENTION

This invention relates generally to a planter box and, more specifically, to a planter box for adorning cemetery monuments.

Loved ones and friends of deceased persons commonly memorialize their gravesites with flowers, flags and the like. Prior holders for such memorial items include hooks, brackets and receptacles of various types usually supported by a tripod or harness attachable to a gravestone. Examples of such holders are disclosed in U.S. Pat. Nos. 3,145,847; 3,164,343; 3,326,504 and 3,511,461. However, the prior devices have suffered from various faults including, for example, relatively high cost, difficult mounting requirements, minimal use flexibility, and inability to accommodate live plants.

The object of this invention, therefore, is to provide an improved device for use in memorializing gravesites.

SUMMARY OF THE INVENTION

The invention is a cemetery planter including a box having a first box portion with a bottom wall, a front wall, a back wall, an end wall and an open end, and a second box portion with a bottom wall, a front wall, a back wall, an end wall and an open end; the open end of the first box portion being received by the open end of the second box portion during sliding engagement therebetween. Also included are a plurality of longitudinally spaced apart U-shaped brackets substantially parallel to the end walls and substantially conforming to the front, back and bottom walls of the box portions; each U-shaped bracket having one end defining an inwardly directed first hook portion for engaging an upper front edge of the box and an opposite end defining an inwardly directed second hook portion for engaging an upper rear edge of the box and the first and second hook portions being shaped to receive pairs of overlapped front and back wall portions of the slidably engaged first and second box portions. A mounting mechanism facilitates attachment of the box to a support surface. The sliding engagement allows length adjustment of the box while the first and second hook portions provide stability and guidance.

According to certain features of the invention, each opposite end further defines an outwardly directed third hook portion; the mounting mechanism includes a first L-shaped bracket having a first length portion substantially parallel to the end wall of the first box portion and a transverse second length portion substantially parallel to the back wall of the first box portion; and a second L-shaped bracket having a first length portion substantially parallel to the end wall of the second box portion and a second length portion substantially parallel to the back wall of the second box portion. The first length portions attach to, respectively, the first and second box portions and the second length portions engage a back surface of a cemetery monument.

According to other features of the invention, the end walls have an upper edge defining an outwardly extending lip; and each of the first and second length portions has an upper edge defining an outwardly directed shoulder portion for engaging a different one of the lips. The lips and shoulder portions facilitate attachment of the first length portions to the first and second box portions.

According to still other features of the invention, each of the lips and shoulder portions have aligned openings, at least some of which are slots substantially parallel to end side walls, attachment is made by screws received by the aligned openings.

According to one embodiment of the invention, the mounting mechanism includes a plurality of mechanisms each securable to the mounting surface and defining a receiving portion for receiving one of the outwardly directed third hook portions. The hook portions simplify attachment of the box to the mounting surface.

According to certain features of the above embodiment, each mounting mechanism includes a mounting plate defining a projecting eye forming the receiving portion and openings for receiving fasteners. The eye facilitates attachment of the mounting plates to the box and the openings facilitate attachment of the plates to the mounting surface.

According to yet another feature of the invention, each mounting mechanism further includes a second plate having holes aligned with the openings in the mounting plate. The first and second plates straddle individual rungs when the box is mounted on a metallic railing.

According to additional features, the holes are defined in outwardly projecting portions of the second plate and the plates are secured together by screws projecting through aligned pairs of the opening and holes.

According to a further feature of the invention, the box includes a plurality of wedge shaped members having upper wall portions attachable to the bottom walls of the first and second box portions. The wedge shaped members facilitate leveling of the box when mounted on a monument having a sloped base.

DESCRIPTION OF THE DRAWINGS

These and other objects and features of the invention will become more apparent upon a perusal of the following description taken in conjunction with the accompanying drawings wherein:

FIG. 4 is a side view of a bracket used with the planter shown in FIGS. 1–3;

FIG. 5 is a top right perspective of an accessory for use with the planter of FIGS. 1–3;

FIG. 6 is a rear left perspective of the accessory shown in FIG. 5;

FIG. 7 is a side view of the planter of FIGS. 1–3 mounted on a cemetery monument; and FIG. 8 is a perspective view of the planter of FIGS. 1–3 mounted on a railing.

DESCRIPTION OF THE PREFERRED EMBODIMENT

Figure 1:
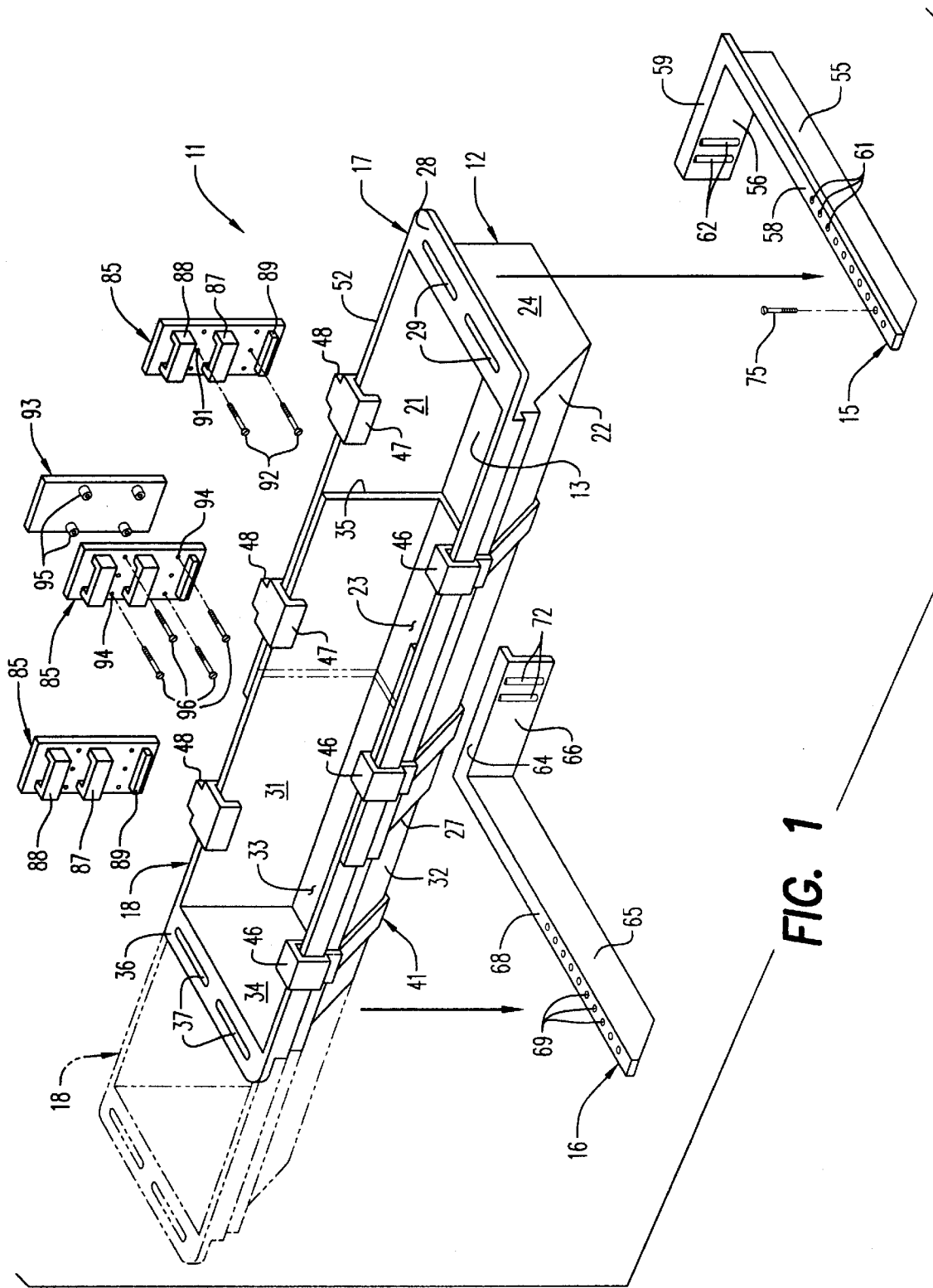
FIG. 1 is an exploded front right perspective view of a cemetery planter according to the invention.
Figure 2:
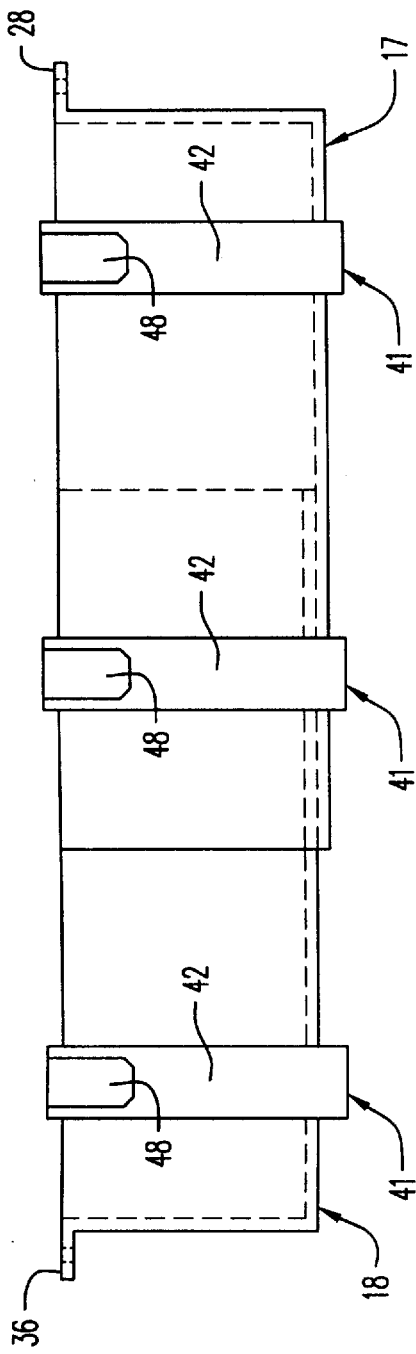
FIG. 2 is a rear view of the planter shown in FIG. 1.

A planter 11 includes a box 12 forming a cavity 13. During use of the planter 11, the cavity 13 can be filled with suitable soil (not shown) in which plants can be grown. Alternatively, the cavity 13 can, if desired, retain memorial items such as artificial flowers and the like. A pair of L-shaped mounting brackets 15, 16 can be utilized to mount the planter 11 on a suitable support surface such as a cemetery monument as illustrated in FIG. 7 and described hereinafter.

The box 12 is formed by slidably engaged first and second box portions 17, 18. Forming the first box portion 17 are a back wall 21, a front wall 22, a bottom wall 23, and first and second ends consisting of, respectively, a right end wall 24 and an open end 27. A transverse lip portion 28 projects outwardly from an upper edge of the end wall 24 and defines aligned, spaced apart slots 29. Similarly, the second box portion 18 is formed by a back wall 31, a front wall 32, a bottom wall 33 and a left end wall 34 while a right end defines an open end 35 which is received by the open end 27 of the first box portion 17. A transverse lip portion 36 projects outwardly from an upper edge of the end wall 34 and defines spaced apart, aligned slots 37. As shown by dashed lines in FIG. 1, the length of the planter 11 can be selected by appropriately adjusting a sliding engagement between the first and second box portions 17, 18.

Figure 3:
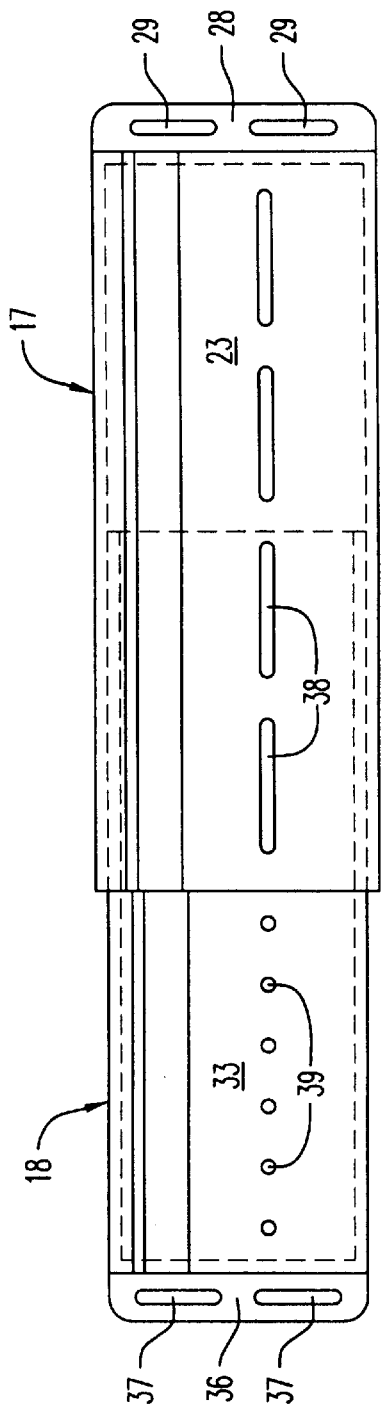
FIG. 3 is a bottom view of the planter shown in FIGS. 1 and 2.

As shown in FIG. 3, a plurality of longitudinally aligned slots 38 are formed in the bottom wall 23 of the first box portion 17 while the bottom wall 33 of the second box portion 18 defines a plurality of longitudinally spaced apart holes 39 which can be aligned with the slots 38 by relative movement between the box portions 17, 18. The slots 38 and holes 39 provide passages for excess water received by soil retained in the cavity 13 of the planter 11.

Also included in the planter 11 are a plurality of U-shaped brackets 41 longitudinally spaced apart along the outer surfaces of the planter 11. Each bracket 41 includes a back wall 42, a front wall 43 and a bottom wall 44 which conform generally to, respectively, the front, back and bottom walls of the first and second box portions 17, 18. One end of each bracket 41 defines an inwardly directed first hook portion 46 while an opposite end thereof defines both an inwardly directed second hook portion 47 and an outwardly directed third hook portion 48.

After assembly of the planter 11, the first hook portions 46 of the brackets 41 receive upper front edges of the first and second box portions 17, 18 and the second hook portions 47 receive the upper rear edges 52 of the first and second box portions 17, 18. Both of the first and second hook portions 46, 47 have widths sufficient to receive overlapped pairs of front and back wall portions of the slidably engaged first and second box portions 17, 18 as depicted in FIG. 1. The first and second hook portions 46, 47 therefore function to both guide sliding movements between the first and second box portions 17, 18 and to stabilize therebetween selected final relative positions. Those relative positions also can be secured by inserting screws (not shown) through the aligned slots 38 and holes 39 in, respectively, the first and second box portions 17, 18.

The first mounting bracket 15 includes a first length portion 55 and a second length portion 56 transverse thereto. Formed along upper edges of the first and second length portions 55, 56 are, respectively, outwardly directed shoulder portions 58, 59. The shoulder portion 58 defines a plurality of aligned, spaced apart openings 61 while a pair of vertical ridges 62 are formed on an inner surface of the second length portion 56. Similarly, the second mounting bracket 16 has a first length portion 65 and a transverse second length portion 66. An upper edge of the first length portion 65 defines an outwardly directed shoulder portion 68 while an upper edge of the second length portion defines an outwardly directed shoulder portion 64. Formed in the shoulder portion 68 are a plurality of aligned, spaced apart openings 69 and a pair of vertical ridges 72 are formed on an inner surface of the second length portion 66.

During assembly of the planter 11, the first length portion 55 and shoulder portion 58 of the mounting bracket 15 are brought into engagement with, respectively, the outer surface of the end wall 24 and lower surface of the lip portion 28 of the first box portion 17. Then the mounting bracket 15 is secured to the first box portion 17 by insertion of attachment screws 75 through aligned openings 61 in the shoulder portion 58 and slots 29 in the lip portion 28. Similarly, the second bracket 16 is secured to the second box portion 18 by insertion of attachment screws 75 through aligned openings 69 in the shoulder portion 68 and slots 37 in the lip portion 36.

After assembly, the planter 11 can be mounted on a cemetery monument such as a gravestone 77 as shown in FIG. 7. The third hook portions 48 of the brackets 41 engage a front surface 78 of an upright portion 76 of the monument 77 and the second length portions 56, 66 of, respectively, the mounting brackets 15, 16 engage a rear surface 79 of the upright portion 76. The relative positions of the mounting brackets 15, 16 and, respectively, the first and second box portions 17, 18 are adjusted to establish between the second length portions 56, 66 and outer surfaces of the third hook portions 48 a spacing substantially equal to the width of the upright portion 76 of the monument 77. After mounting of the planter 11 on the monument 77, the third hook portions 48 of the brackets 41 establish between the front surface 78 of the upright portion 79 and the back walls 21, 31 of, respectively, the first and second box portions 17, 18, spaces 80 that allow passage of moisture, the retention of which could undesirably stain the monument 77.

In the event that a base 81 of the monument 77 has a sloping upper surface 82 as shown in FIG. 7, a plurality of mounting accessory members 84 (FIGS. 5, 6) are used to stabilize the planter 11. The member 84 has a horizontal upper wall portion 85 and a vertically extending, wedge shaped side wall portion 86. Formed in the upper wall portion 85 is an elongated slot 87. As shown in FIG. 7, the members 84 are disposed with the upper wall portions 85 engaging the bottom surface of the planter 11 and lower edges of the wedge shaped side wall portions 86 engaging the sloping upper surface 82 of the monument base 81. The members 84 are secured by insertion of self capping screws (not shown) through the slots 38 and holes 39 in, respectively, the bottom walls 23, 33.

The planter 11 can be mounted also on surfaces other than cemetery monuments such as wooden window frames, deck railings and the like. In such applications, plates 85 shown in FIG. 1 are utilized for mounting the planter 11. As shown, one mounting plate 85 is used with each of the U-shaped brackets 41. Formed in each mounting plate 85 are a pair of outwardly projecting, vertically aligned eyes 87, 88. Also defined by the plate 85 below the eyes 87, 88 is a horizontal spacer rib 89 and a plurality of spaced apart openings 91. The mounting plates 85 are secured to a desired wooden mounting surface with wood screws 92 inserted through the openings 91. Proper positioning of the mounting plates 85 establishes horizontal alignment thereof and spacings therebetween to match the spacings between the U-shaped brackets 41 of the planter 11. After securing of the mounting plates 85 to a wooden mounting surface (not shown), the planter 11 is mounted by inserting the third hook portions 48 of the brackets 41 through the aligned eyes 87, 88.

The planter 11 also can be easily mounted on the vertical rungs of a metallic railing (not shown) by including in the mounting mechanism a second mounting plate 93 (FIG. 1) for each mounting plate 85. The second mounting plate 93 has a plurality of internally threaded stud projections 95 disposed to accommodate alignment with openings 94 in the mounting plate 85. During the mounting procedure, pairs of the mounting plates 85, 93 are positioned in a straddling relationship to horizontally spaced apart metallic rungs as shown in FIG. 8. Fastener screws 96 then are inserted through the openings 94 in the plates 85 and into threaded engagement with the studs 95 of the mounting plates 93. The fastening screws 96 are tightened to establish secure engagement of the mounting plates 85, 93 with the straddled rungs. After mounting of the plates 85, 93, the planter 11 is mounted in the manner described above by insertion of the third hook portions 48 of the U-shaped brackets 41 into the aligned eyes 87, 88 of the mounting plates 85.

Obviously, many modifications and variations of the present invention are possible in light of the above teachings. It is to be understood, therefore, that the invention can be practiced otherwise than as specifically described.

What is claimed is:

1. A cemetery planter comprising:
    a box comprising a first box portion having a bottom wall, a front wall, a back wall, an end wall and a second open end; and a second box portion having a bottom wall, a front wall, a back wall, an end wall and an open end; said second end of said first box portion being received by said open end of said second box portion during sliding engagement of said first box portion and said second box portion thereby facilitating length adjustment of said box to a length accommodating the width of a cemetery monument; and said bottom walls, said front walls, said back walls, and said end walls defining a closed vessel for retaining potting soil;
    a plurality of longitudinally spaced apart U-shaped brackets substantially parallel to said end walls and substantially conforming to said front, back and bottom walls of said box portions; each said U-shaped bracket having one end defining an inwardly directed first hook portion for engaging an upper front edge of said box and an opposite end defining an inwardly directed second hook portion for engaging an upper rear edge of said box and an outwardly directed third hook portion formed by outwardly and downwardly projecting sections;
    mounting means shaped and arranged for securing said box to a mounting surface; and
    attachment means for attaching said mounting means to said box.

2. A planter according to claim 1 wherein said second end is an open end; and said first and second hook portions are shaped to receive pairs of overlapped front and back wall portions of said slidably engaged first and second box portions.

3. A planter according to claim 2 wherein said mounting means comprises a first L-shaped bracket having a first length portion extending substantially parallel to said end wall of said first box portion and a transverse second length portion extending substantially parallel to said back wall of said first box portion; and a second L-shaped bracket having a first length portion extending substantially parallel to said end wall of said second box portion and a second length portion extending substantially parallel to said back wall of said second box portion; and including attachment means for securing said first length portions to, respectively, said first and second box portions.

4. A planter according to claim 3 wherein each of said walls has an upper edge defining an outwardly extending lip; and each of said first and second length portions has an upper edge defining an outwardly directed shoulder portion for engaging a different one of said lips.

5. A planter according to claim 4 wherein each pair of said lips and said shoulder portions have aligned openings, and said attachment means comprises screws received by said aligned openings.

6. A planter according to claim 5 wherein at least some of said openings are slots substantially parallel to said end walls.

7. A planter according to claim 6 including a plurality of wedge shaped members having upper wall portions attachable to said bottom walls of said first and second box portions.

8. A planter according to claim 2 wherein said mounting means comprises a plurality of mounting mechanisms each securable to the mounting surface and defining a receiving portion for receiving one of said outwardly directed third hook portions.

9. A planter according to claim 8 wherein each said mounting mechanism comprises a mounting plate defining a projecting eye forming said receiving portion and openings for receiving fastener means.

10. A planter according to claim 9 wherein each said mounting plate further defines a second eye aligned with said projecting eye and projecting outwardly from said plate.

11. A planter according to claim 9 wherein each said mounting mechanism further comprises a second plate having holes aligned with said openings in said mounting plate.

12. A planter according to claim 11 wherein said holes are defined in outwardly projecting portions of said second plate.

13. A planter according to claim 12 wherein said fastener means comprises screws projecting through aligned airs of said openings and holes.

14. A cemetery planter comprising:
    a box comprising a first box portion having a bottom wall, a front wall, a back wall, and first and second ends; and a second box portion having a bottom wall, a front wall, a back wall, an end wall and an open end; said second end of said first box portion being received by said open end of said second box portion during sliding engagement of said first box portion and said second box portion thereby facilitating length adjustment of said box;
    a plurality of longitudinally spaced apart U-shaped brackets substantially parallel to said end walls and substantially conforming to said front, back and bottom walls of said box portions; each said U-shaped bracket having one end defining an inwardly directed first hook portion for engaging an upper front edge of said box and an opposite end defining an inwardly directed second hook portion for engaging an upper rear edge of said box;
    mounting means shaped and arranged for securing said box to a mounting surface said mounting means comprising a first L-shaped bracket having a first length portion extending substantially parallel to said end wall of said first box portion and a transverse second length portion extending substantially parallel to said back wall of said first box portion; and a second L-shaped bracket having a first length portion extending substantially parallel to said end wall of said second box portion and a second length portion extending substantially parallel to said back wall of said second box portion; and including attachment means for securing said first length portions to, respectively, said first and second box portions; and
    attachment means for attaching said mounting means to said box.

15. A planter according to claim 14 wherein each of said end walls has an upper edge defining an outwardly extending lip; and each of said first and second length portions has an upper edge defining an outwardly directed shoulder portion for engaging a different one of said lips.

16. A planter according to claim 15 wherein each pair of said lips and said shoulder portions have aligned openings, and said attachment means comprises screws received by said aligned openings.

17. A planter according to claim 16 wherein at least some of said openings are slots substantially parallel to said end walls.

18. A planter according to claim 17 including a plurality of wedge shaped members having upper wall portions attachable to said bottom walls of said first and second box portions.

19. A cemetery planter comprising:

a box comprising a first box portion having a bottom wall, a front wall, a back wall, and first and second ends; and a second box portion having a bottom wall, a front wall, a back wall, an end wall and an open end; said second end of said first box portion being received by said open end of said second box portion during sliding engagement of said first box portion and said second box portion thereby facilitating length adjustment of said box;

a plurality of longitudinally spaced apart U-shaped brackets substantially parallel to said end walls and substantially conforming to said front, back and bottom walls of said box portions; each said U-shaped bracket having one end defining an inwardly directed first hook portion for engaging an upper front edge of said box and an opposite end defining an inwardly directed second hook portion for engaging an upper rear edge of said box and an outwardly directed third hook portion;

mounting means shaped and arranged for securing said box to a mounting surface said mounting means comprising a plurality of mounting mechanisms each securable to the mounting surface and defining a receiving portion for receiving one of said outwardly directed third hook portions; and each said mounting mechanism comprising a mounting plate defining a projecting eye forming said receiving portion and openings for receiving fastener means; and attachment means for attaching said mounting means to said box.

* * * * *